United States Patent [19]
Drischel

[11] 3,802,635
[45] Apr. 9, 1974

[54] INSTALLATION FOR REMOVING FATS FROM MEAT PULP AND FOR PRODUCING MEAT MEAL

[75] Inventor: Karl Drischel, Romereck, Germany

[73] Assignee: Firma Wehrle-Werk Aktiengesellschaft, Emmendingen/Baden, Germany

[22] Filed: June 12, 1972

[21] Appl. No.: 261,806

[52] U.S. Cl. ............... 241/282, 100/127, 241/199.6
[51] Int. Cl. ........................ B02c 18/14, B30b 9/06
[58] Field of Search......... 241/78, 83, 152 R, 199.6; 100/110, 116, 127, 130; 99/110, 233.9

[56] References Cited
UNITED STATES PATENTS
3,168,033  2/1965  Hansen .......................... 100/127 X
2,909,984  10/1959  Rycraft et al. ..................... 241/78 X Primary Examiner—Roy Lake
Assistant Examiner—E. F. Desmond
Attorney, Agent, or Firm—Eric H. Waters

[57] ABSTRACT

An installation for removing fats from meat pulp including a pressing cylinder into which meat pulp is conveyed, a piston in the cylinder for compacting the meat pulp, the cylinder having a strainer permitting egress of the fats from the meat pulp and compressing of the latter into brickets, an adjustable apertured hollow cylinder receiving the brickets, and including cutting means for segmenting the brickets for processing into meat meal. A plurality of pressing cylinders may be connected to a single meat pulp infeed and to a commonly connected hollow cylinder having cutters so as to increase the capacity of the installation.

9 Claims, 11 Drawing Figures

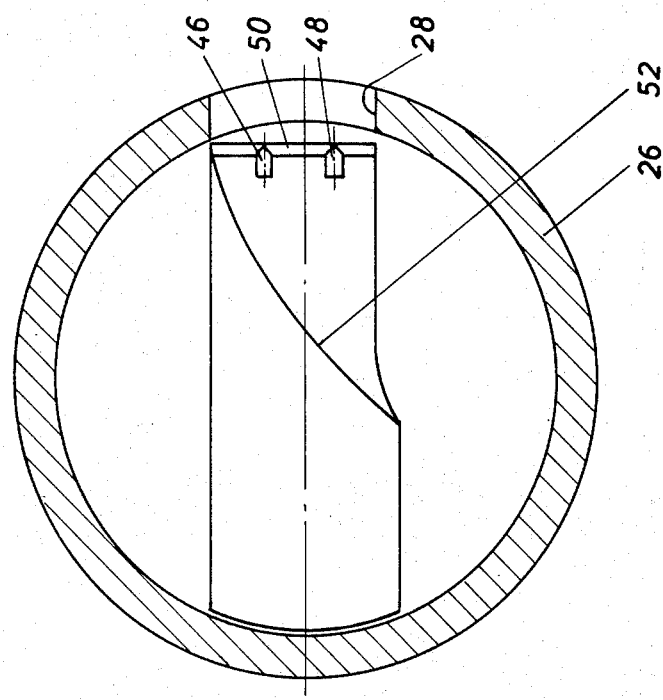
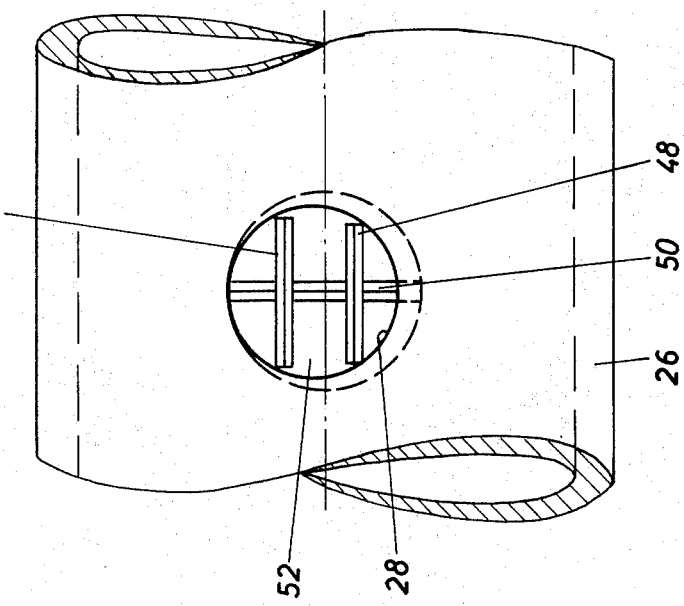

INSTALLATION FOR REMOVING FATS FROM MEAT PULP AND FOR PRODUCING MEAT MEAL

FIELD OF THE INVENTION

The present invention relates to an installation for removing fats from meat pump and, more particularly, to an installation for producing meat meal.

DESCRIPTION OF THE PRIOR ART

In utilizing animal carcasses it has heretofore been the practice that, subsequent to the pre-cooking of the carcasses, the processed meat and animal fat pulps have been treated with chemical materials so as to provide for ready separation between the animal fats and the meat meal of the subsequently processed components. This complicated and relatively expensive prior art process is considerably simplified by the present invention.

SUMMARY OF THE INVENTION

Accordingly, in order to provide the required solution to the foregoing problems in the prior art, the present invention provides for a meat pulp feeding arrangement which is connected with at least one press cylinder having a hydraulically actuated piston, with the press cylinder including a pressing strainer at one end about its peripheral wall for the removal of animal fats from the meat pulp, an adjustable end wall which in one predetermined operative end position thereof closes the end of the press cylinder which is adjacent to the pressing strainer and which, in its other operative end position, forms an aperture at that end for egress of compressed meat pulp, and a cutting or chopping device being positioned at the downstream or outlet side of the wall to effect the cutting up of the compressed meat pulp forced through the opening.

By utilizing an installation incorporating the foregoing characteristics, it is possible to, in a single, practically fully automatic sequence, simply remove animal fats from the meat pulp and then to further process the latter by grinding the meat pulp brickets which are formed by the removal of the fats and by the compressing of the pulp. The installation requires only relatively simple and purely mechanical components and, consequently, is readily serviced and operated. No additional chemical treatment of the meat pulp product is required. The meat pulp is introduced in a continuous sequence into the infeed arrangement and immediately conveyed into the portions of the press cylinder positioned intermediate the pressing strainer and the pressing piston. The pressing piston is then moved forwardly to an extent so as to prevent the further introduction of meat pulp into the cylinder by the infeed arrangement, and permitting to impart a pressure on the meat pump contained within the press cylinder. This pressure may, for example, reach 150 atmospheres, which is maintained over a predetermined time interval, for example, 30 to 40 seconds. During this time, the animal fat in the meat pulp is ejected from the press cylinder through the pressing strainer and may be collected in a suitable receptacle. At that time the adjustable end wall, which up to that point closed off the end of the press cylinder adjacent the pressing strainer, is moved so as to provide alignment between an aperture formed in the end wall and with the adjoining open end of the press cylinder. Subsequently, the press piston is moved further forwardly within the cylinder so that the formed meat pulp bricket is ejected out of the cylinder through the aperture in the adjustable end wall. Closely spaced to the aperture, and downstream of the end wall, is a suitable cutting device which cuts or chops the brickets into smaller segments so that the latter may be readily further processed into meat meal.

The adjustable end wall may be advantageously formed so as to constitute the casing or shell of a hollow cylinder which is rotatable about its longitudinal axis. This has the advantage that the cylindrical configuration provides for a better resistance to the internal pressure generated within the press cylinder, and furthermore, the hollow cylinder concurrently serves as a housing for the cutting device.

In order to provide for adjustment or rotation of the hollow cylinder, suitable hydraulic cylinders may be connected to the outer wall thereof. This is possible since the hollow cylinder must be displaced or rotated through only a small angular displacement, which is somewhat larger than twice the diameter of the aperture communicating with the press cylinder.

The hollow cylinder is supported by means of stationary disc-shaped plates which are positioned within the end wall openings thereof. The stationary plates may be provided about their circumferential edges with a plurality of cut-outs, which facilitate inspection of the interior of the hollow cylinder and concurrently reduce the amount of rubbing friction between the hollow cylinder wall and the contacting surfaces of the stationary plates.

The entire installation, which is constituted of the press cylinder with the hydraulically actuated piston and the adjustable end wall, and the device within the hollow cylinder, may, in an advantageous embodiment, be supported and encompassed by a closed double-T-support frame, which further provides for support for the hydraulic actuating components for the press piston, and for the supporting components of the adjustable end wall, in effect, the hollow cylinder. This embodiment is particularly simple in construction since it eliminates the need for further supporting walls and reinforcing members.

The infeed arrangement for the meat pulp may preferably be formed as a funnel which is connected at its lower end with an inlet aperture provided in the peripheral wall of the press cylinder adjacent the pressing strainer. The inlet aperture is closed by the press piston upon the forward movement thereof so as to cut off further infeed of meat pulp into the cylinder. The pressing cylinder may be downwardly inclined away from the adjustable end wall whereby the meat pulp material introduced through the inlet aperture always flows first towards the pressing piston.

In a preferred embodiment a plurality of pressing cylinders are positioned adjacent to each other along the length of the adjustable end wall or hollow cylinder. A common or single infeed arrangement for the meat pulp may be provided for all of the press cylinders, which is connected to all of the inlet apertures of all of the press cylinders. Above the inlet apertures, in accordance with a further advantageous embodiment, there may be provided an impeller wheel having an axis of rotation extending in parallel to the length of the adjustable end wall. This will provide for the concurrent or simultaneous distribution and conveyance of the meat pulp material into all of the press cylinders which operate in conjunction with the same hollow cylinder. The output capacity of the installation is thereby greatly enhanced or multiplied.

It has also been determined that preferably the pressing strainer includes outlet apertures for the fats in the meat pulp having diameters not in excess of 1 millimeter. The apertures may extend about the entire peripheral surface of one end of the press cylinder.

Since the infeed of the meat pulp and the solids materials contained therein is not equally effected in all of the press cylinders, it becomes advantageous that the pressure applied to each of the various press pistons be individually adjustable. The press pistons consequently are connected to their own hydraulic cylinders which provide for the automatic cutoff of further pressure upon the pressure valves reaching a predetermined maximum level.

Further, it is advantageous that the return movement or strokes of all of the pistons be controlled by a simple contact limit switch actuated by a single press piston which has a time-retarded return movement.

The foregoing single press piston is returned at a slower rate than all of the other pistons so as to permit all of these pistons to reach their return stroke end positions preceding to when the other single piston actuates the contact limit switch.

The cutting device positioned downstream or at the outlet of the adjustable end wall, in effect, within the hollow cylinder, is formed preferably of a plurality of cutters, which have cutting edges extending toward the opening in the adjustable end wall. In a preferred arrangement the cutters are positioned perpendicularly to each other so as to cut or chop the compressed meat pulp brickets into approximately equally sized particles.

In the construction of the adjustable end wall as a hollow cylinder, positioned below the cutting device and within the hollow cylinder, is a conveyor screw having a fixed or stationary longitudinal axis and which is positioned in alignment with an outlet aperture formed in the lower portion of the hollow cylinder. The chopped or cut-up compressed meat pulp material received from the cutting arrangement is consequently conveyed by the conveyor screw through the outlet aperture and may then be directly processed into meat meal. The conveyor screw may be supported by the plates provided for the support of the hollow cylinder.

BRIEF DESCRIPTION OF THE DRAWINGS

In order to obtain a more complete understanding of the invention, reference may now be had to the preferred embodiments thereof, in conjunction with the accompanying drawings, in which:

FIG. 10 is an enlarged front view of a cutter arrangement, as viewed through the aligned aperture in the hollow cylinder and the press cylinder; and FIG. 11 is a schematic side view of the cutter arrangement showing a portion of the hollow cylinder.

DETAILED DESCRIPTION

Figure 1:
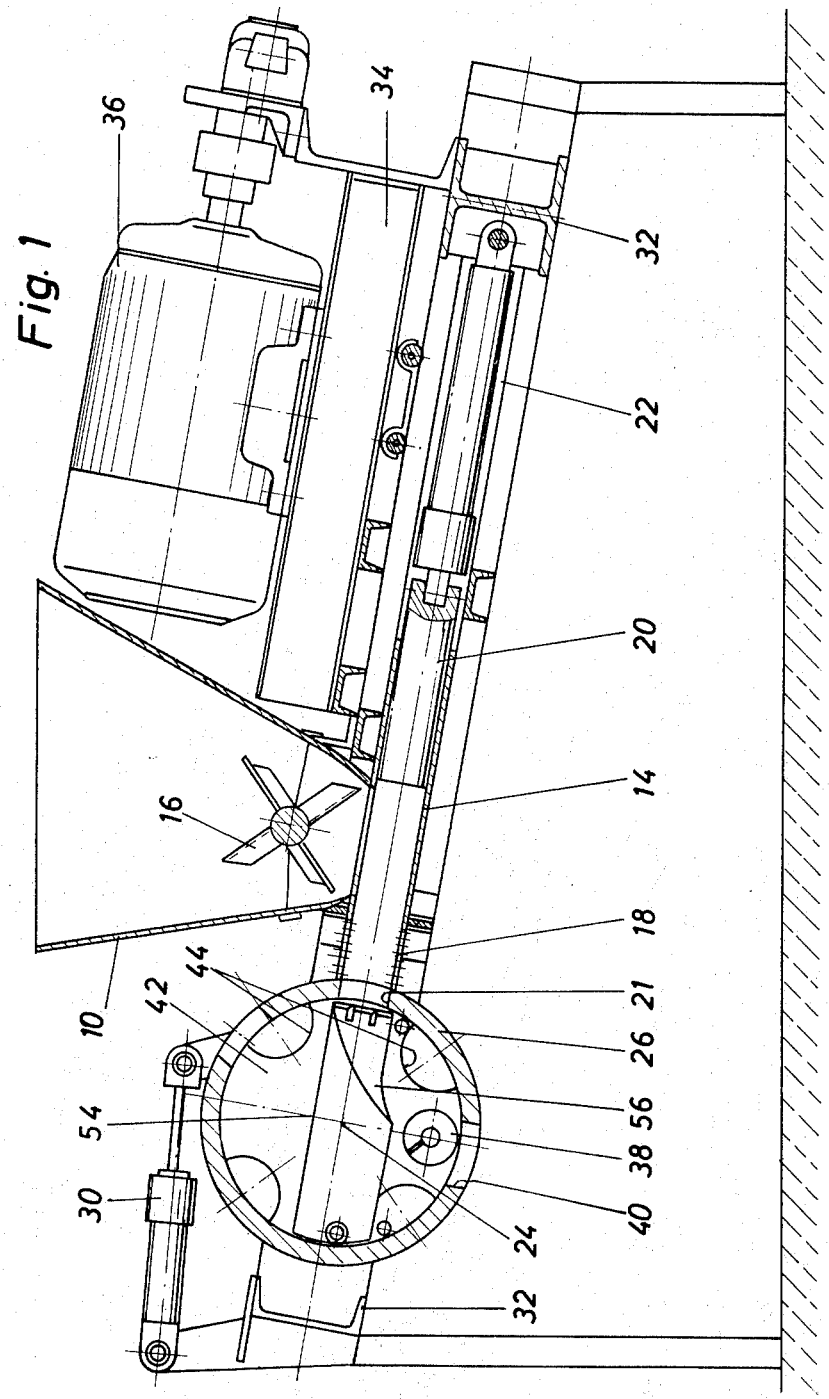
FIG. 1 is a schematic side view, partly in section, of an installation according to the present invention.
Figure 2:
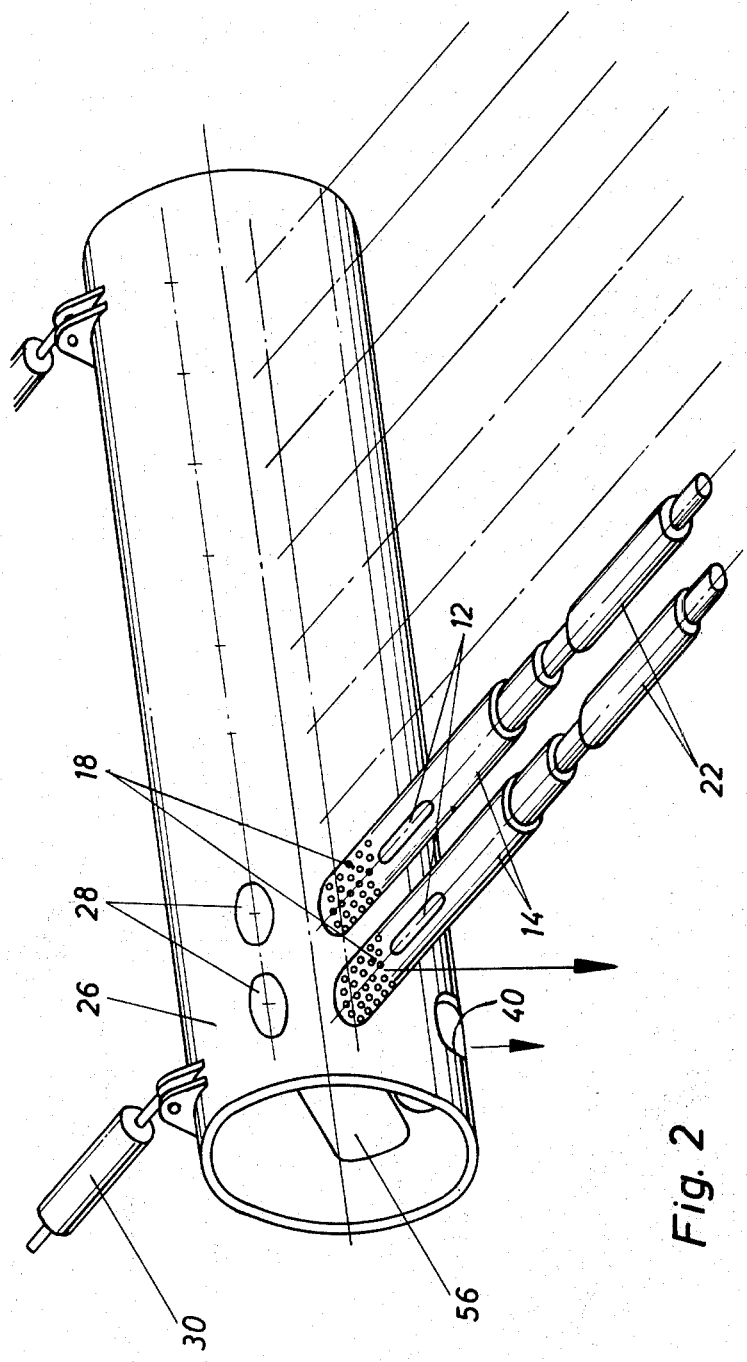
FIG. 2 is a schematic perspective view of a portion of the installation illustrating the hollow cylinder and a plurality of press cylinders.
Figure 3:
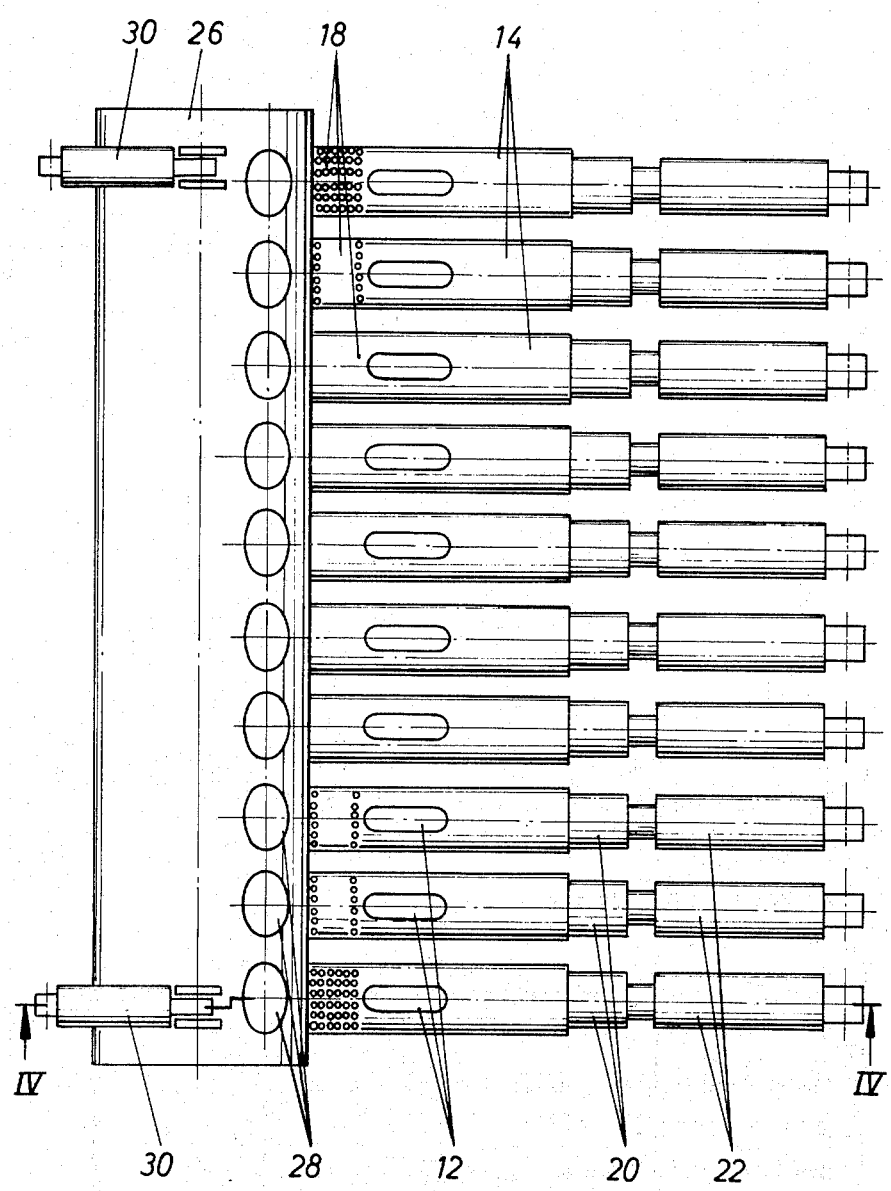
FIG. 3 is a plan view of portions of the installation showing a hollow cylinder and a plurality of press cylinders.

Referring now in detail to the embodiments disclosed in the drawings, a funnel-shaped infeed container 10 which is open at its top extends downwardly into material feeding connection with a plurality of parallel arranged press cylinders 14 through infeed openings 12. Above the infeed openings 12, and positioned within the funnel 10, there is located an impeller wheel 16 which provides for the relatively equally distributed conveyance of the meat pulp material into the press cylinders. Adjacent one end thereof each press cylinder 14 is provided with a pressing strainer 18 which is formed by a plurality of small openings extending about the entire periphery of that end of the press cylinders, with the openings having diameters not exceeding 1 millimeter. The pressing strainer may be encompassed by a suitable receptacle (not shown) for receiving the separated animal fat.

Within each press cylinder 14 there is provided a slidable press piston 20, which is, at its pressure side or rearwardly extending end connected to a hydraulic cylinder 22.

Figure 4:
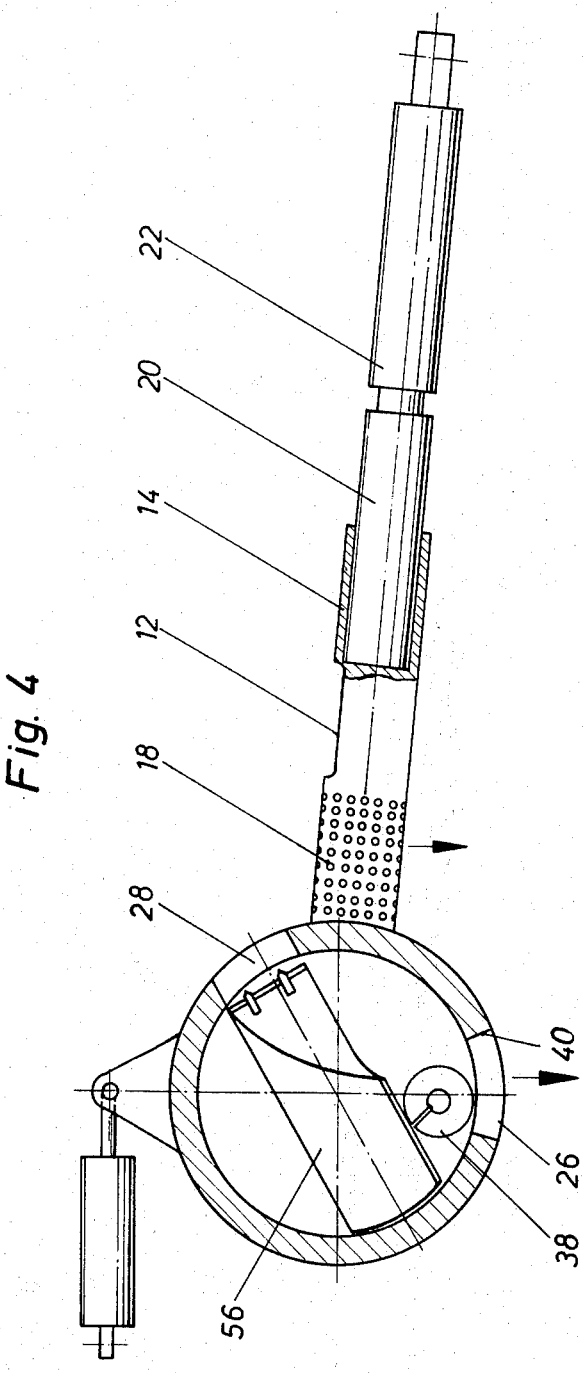
FIG. 4 is a sectional view along line 4—4 in FIG. 3.
Figure 8:
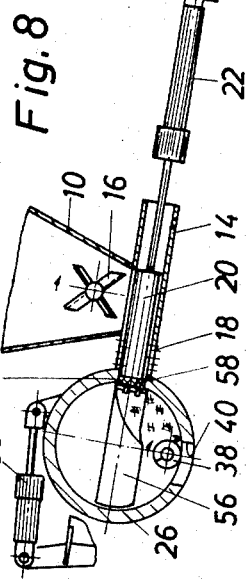
FIGS. 5 through 9 are side views, partly in section, of components of the installation showing a hollow cylinder and press cylinder during various steps in the operative cycle thereof.
Figure 9:
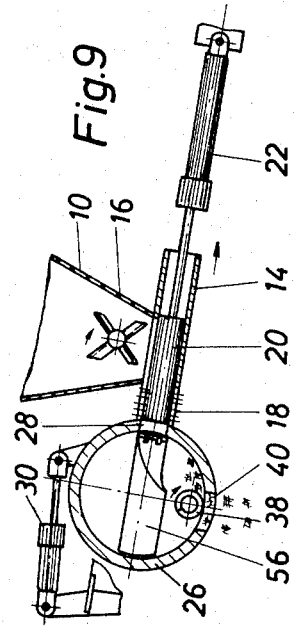

The end of the press cylinder 14 which is adjacent to the pressing strainer 18 is open and is contacted by the outer wall surface of a hollow cylinder 26, the latter of which is rotatable about a longitudinal axis 24. The hollow cylinder 26 has a generally circular opening 28 which, in the operative position of the hollow cylinder shown in FIG. 1, is in alignment with the open end of the press cylinder 14. The rotation of the hollow cylinder 26 between the positions shown in FIG. 1 and in FIG. 4 is provided for by actuation of hydraulic cylinders 30 which are connected to the outer wall of the hollow cylinder. The entire installation of the plurality of adjacent positioned press cylinders 14, including the hydraulic cylinders 22 and the hollow cylinder 26, are encompassed and supported by a peripherally extending, closed frame which is formed of a double-T support 32. Also supported on this frame 32 are, on one side the hollow cylinder 26, and on the other side the rearwardly extending ends of the hydraulic cylinder 22.

A further frame 34 is supported on the above-mentioned frame 32, so as to provide support for an electromotor 36.

By means of the electromotor 36 the impeller wheel 16 and the output screw 38 located in the lower portion of hollow 26 are constantly maintained in rotation through suitable intermediary components (not shown).

The output screw 38 is positioned in alignment with one or more openings 40 formed in the lower portion of the hollow cylinder so as to provide for egress of the cut-up or chopped materials from the hollow cylinder.

The hollow cylinder 26 is rotatably supported at both ends thereof on the peripheral surfaces of stationary discs or plates 42 of which, in FIG. 1, the rear one of the plates is visible. These plates are provided along their peripheral edges with a plurality of cut-outs 44 which facilitate the visual inspection of the interior of the hollow cylinder and thereby of the operating process, and furthermore provide for a reduction of friction between the hollow cylinder and the plates 42.

Within hollow cylinder 26 there is provided, adjacent each opening 28, a cutting device which is rigidly fastened to the hollow cylinder, which is constructed of two parallel extending cutters 46 and 48 and a perpendicularly extending cutter 50, and which also includes a material guiding chute 52 extending diagonally from the upper portion of the opening 28 down interiorly of hollow cylinder 26. The cutter device and the guide chute 52 are connected to the opposite inner wall of the hollow cylinder 26 by means of a rigid tube 54. In view of the foregoing the components of the cutting device 56 rotate concurrently with the hollow cylinder 26 about a predetermined annular displacement, as further discussed hereinbelow.

Figure 5:
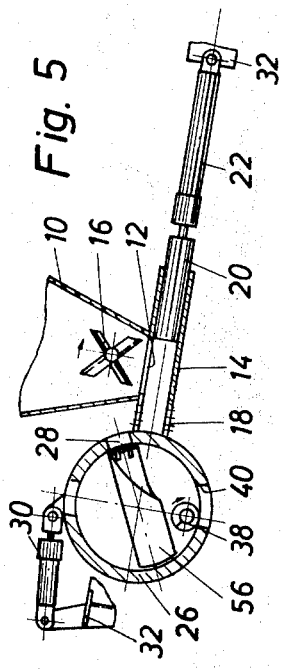
Figure 6:
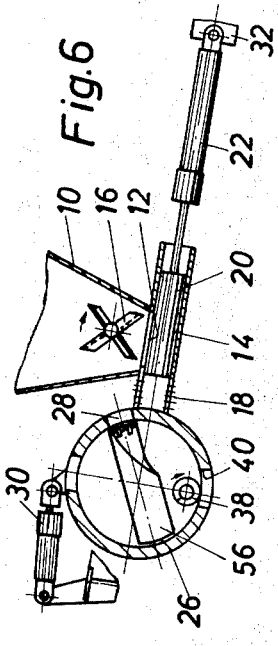
Figure 7:
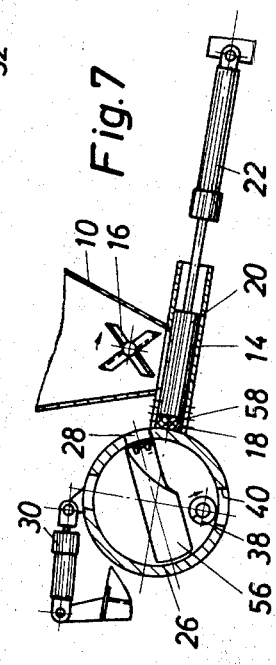

As may be readily ascertained from FIGS. 5 through 9 of the drawings, there is disclosed a complete operating cycle of the present installation. A continuous supply of fat-containing meat pulp and other material to be processed is introduced into the infeed receptacle 10. The constantly rotating impeller wheel 16 assures that the material is conveyed through infeed openings 12 into all of the press cylinders 14. However, the quantities being introduced into the cylinders may nevertheless not be completely equal. During the filling sequence of the material into the press cylinders, the hollow cylinder 26 is positioned as shown in FIG. 5, whereby its end wall adjacent the pressing strainer 18 closes the opening into press cylinder 14. Subsequently, the press cylinders 14 have their press pistons moved into the position illustrated in FIG. 6, through actuation by hydraulic cylinders 22 so as to close off the infeed openings 12 and to provide forward compression or compaction of the material in the space encompassed by the pressing strainers 18. By maintaining a predetermined pressure, for example 150 atmospheres, over a time interval of approximately 30 to 40 seconds, the major portion of the animal fats contained in the meat pulp material is pressed out of the press cylinders through the openings of the pressing strainers 18. Under the aforementioned conditions, a removal of fats of up to 7 percent residual fat content is obtained. The pistons 20 are then, as shown in FIG. 7, subjected to a still higher pressure so as to compress the de-fatted meat pulp material contained within the pressing strainer 18 into small hard brickets 58. Subsequently, the pressure in the hydraulic cylinders 22 is interrupted for a short period to permit rotation of the hollow cylinders 26 contacted by brickets 58 into the position shown in FIG. 8, through actuation of hydraulic cylinder 30. In this position, the openings 28 are located in alignment with the open ends of the press cylinders whereby, upon further pressure being applied to press pistons 20, the brickets 58 are forced on to the cutters of the cutting devices 56. In that way the brickets are cut into at least six approximately equally sized portions or segments and conveyed by means of the guide chute 52 downwardly onto the conveyor or output screw 38. The constantly rotating output screw 38 is adapted to convey the cut-up material through the outlet openings 40. Subsequently, the press pistons 20 are again, in the above-described manner, returned to the position shown in FIG. 5, in which one of the press pistons 20 is returned in a delayed or time-retarded manner, and consequently is positioned last in its return stroke position. Upon this last press piston reaching its return stroke position, it actuates a contact limit switch, which deactivates the hydraulic installation.

What is claimed is:

1. Installation for removing fats from meat pulp and for producing meat meal, comprising: a meat pulp infeed arrangement; at least one press cylinder including an inlet aperture for receiving meat pulp from said arrangement, said cylinder having a hydraulically actuated piston therein, said piston being movable between both ends of said press cylinder; pressing strainer means formed in the peripheral surface of one end of said pressing cylinder for removal of said fats from said meat pulp; an adjustable end wall forming a closure at the end of said press cylinder proximate to said strain means, said adjustable end wall comprising a hollow cylinder casing and being rotatable about its longitudinal axis, said end wall having an aperture facilitating egress of compressed meat pulp from said cylinder in one position of said end wall and said aperture being closed in another position of said end wall; and cutting means positioned adjacent said aperture in said end wall for cutting up compressed meat pulp passed therethrough.

2. Installation as claimed in claim 1, comprising hydraulic cylinder means for imparting rotation to said hollow cylinder casing.

3. Installation as claimed in claim 1, comprising a plurality of said press cylinders spaced along the length of said adjustable end wall, and means for independently regulating the operating pressure acting on each of the pistons of said press cylinders.

4. Installation as claimed in claim 3, comprising contact switch means actuated by one of said pistons upon the end of the return stroke thereof in said press cylinder, said last-mentioned cylinder being retarded relative to the return strokes of the other cylinders and adapted to contact said switch means for stopping the return strokes of all of said pistons.

5. Installation as claimed in claim 1, comprising stationary plate members positioned in the end openings of said rotatable hollow cylinder casing for rotatably supporting the latter.

6. Installation as claimed in claim 5, said stationary plate members having cut-outs provided in the peripheral surface portions thereof.

7. Installation as claimed in claim 1, said cutting means comprising a plurality of cutters having cutting edges extending towards the aperture in said adjustable end wall.

8. Installation as claimed in claim 7, said cutters being arranged to extend perpendicularly relative to each other.

9. Installation as claimed in claim 1, comprising conveyor screw means in said hollow cylinder casing below said cutting means, said conveyor screw means being rotatable about a fixed longitudinal axis; and an outlet opening in the lower portion of said casing in alignment with said screw conveyor for egress of cut-up compressed meat pulp segments.

* * * * *